United States Patent [19]
Yagi et al.

[11] Patent Number: 5,873,685
[45] Date of Patent: Feb. 23, 1999

[54] PRESS PROCESSING METHOD AND PRESS PROCESSING DEVICE

[75] Inventors: Eiichi Yagi, Kobe; Katsumi Nakashima, Akashi; Yasuo Nakano, Kobe; Satoru Sakanaka, Akashi; Toshiaki Nishiyama, Akashi; Hirozo Hishida, Akashi, all of Japan

[73] Assignee: Kawasaki Jukogyo Kabushiki Kaisha, Kobe, Japan

[21] Appl. No.: 803,879

[22] Filed: Feb. 21, 1997

[30] Foreign Application Priority Data

Oct. 8, 1996 [JP] Japan ................................. 8-287686

[51] Int. Cl.[6] ............................................. B23C 1/30
[52] U.S. Cl. ...................... 409/132; 29/26 A; 409/193; 409/201; 409/237; 451/236; 451/487; 901/24
[58] Field of Search ................................ 409/131, 132, 409/138, 193, 201, 211, 216, 237; 901/24, 41; 451/236, 286, 487; 29/26 A

[56] References Cited

U.S. PATENT DOCUMENTS

| | | | |
|---|---|---|---|
| 3,913,582 | 10/1975 | Sharon | 901/41 |
| 3,952,880 | 4/1976 | Hill et al. | |
| 4,500,065 | 2/1985 | Hennekes et al. | 901/41 |
| 4,696,197 | 9/1987 | Hannel . | |
| 5,155,423 | 10/1992 | Karlen et al. | 901/24 |
| 5,174,700 | 12/1992 | Sgarbi et al. | 901/41 |
| 5,265,195 | 11/1993 | Jinno et al. | 901/41 |
| 5,494,034 | 2/1996 | Schlondorff et al. | 901/41 |

FOREIGN PATENT DOCUMENTS

| | | | |
|---|---|---|---|
| 3432773 | 1/1985 | Germany | 901/41 |
| 3514167 | 10/1986 | Germany | 901/41 |
| 61-109663 | 5/1986 | Japan . | |
| A-61-109663 | 5/1986 | Japan . | |
| 63-196367 | 8/1988 | Japan . | |
| A-63-196367 | 8/1988 | Japan . | |
| 64-66715 | 3/1989 | Japan . | |
| 2 235 398 A | 3/1991 | United Kingdom . | |

Primary Examiner—Steven C. Bishop
Assistant Examiner—Adesh Bhargava
Attorney, Agent, or Firm—Oliff & Berridge, PLC

[57] ABSTRACT

The disclosed press processing method and device can chamfer work, for instance by pressing a chamfering tool against the work at a predetermined contact pressure, without detecting the pressing force of the chamfering tool against the work or without feedbacking the detected pressing force to a robot controller. The press processing device used being mounted on automatic mechanical processing means such a multi-joint robot, comprises: a processing section (e.g., grinder) (11) held by a support body (12) in such a way that pressure caused by a dead load of the processing section is not applied to a processing portion (e.g. blade) (11d) of the processing section (11); a constant torque applying section (e.g., servomotor) (16) for pivoting the processing section in a predetermined direction at a constant torque; and a mounting member (20) for mounting the constant torque applying section to a robot arm (R). The work (W) is processed by the processing section (11) in such a state that the processing portion (11d) of the processing section (11) is pressed against the work under a constant pressing force.

16 Claims, 9 Drawing Sheets

PRESS PROCESSING METHOD AND PRESS PROCESSING DEVICE

BACKGROUND OF THE INVENTION

1. Field of the Invention

The present invention relates to a press processing method and a press processing device, and more specifically to a method and device for processing work by pressing a processing portion against the work at a constant force or torque generated by a constant torque applying means.

2. Description of the Prior Art

Conventionally, the mechanical products or parts are generally chamfered or rounded (referred to as chamfered, simply hereinafter) in order to reduce the stress concentration and to improve the fatigue resistance, the mechanical characteristics, the fitness or engagement characteristics, the assembling characteristics, the external appearance thereof, etc. Here, since this chamfering work needs a skill, the work is often replaced with a robot having a hand to which a grinder is mounted.

Figure 7:
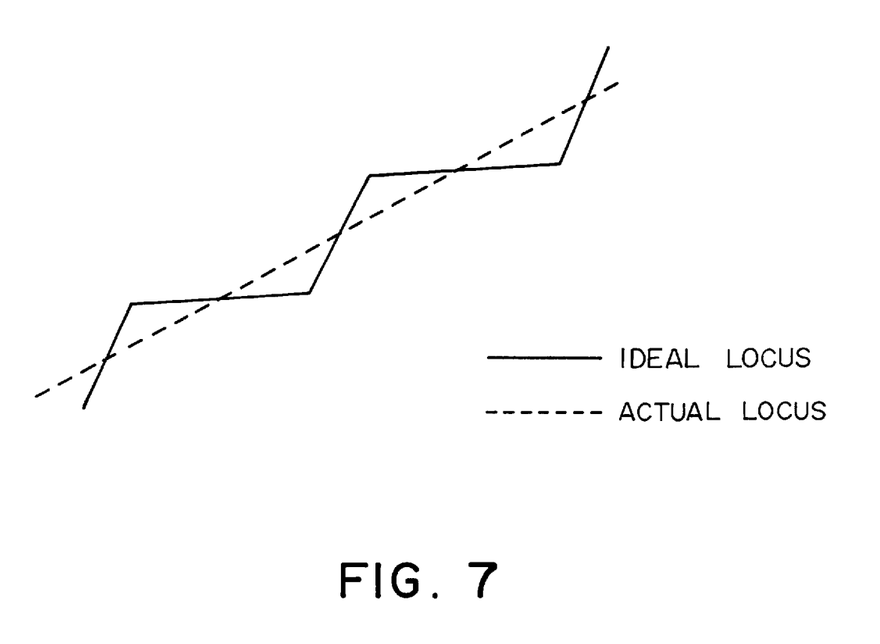
FIG. 7 is an illustration showing a locus of the arm end, obtained when the straight motion of a multi-joint robot is seen microscopically.

Here, whoever, when performed by a grinder mounted on the hand of a multi-joint robot (referred to as robot, simply hereinafter), since this chamfering work must be made by rotating a blade at a low speed and by applying a constant pressure against work to be chamfered, various problems arise due to the characteristics of the multi-joint robot. For instance, since the straight motion of the robot is a zigzag motion when seen microscopically, as shown in FIG. 7, a uniform chamfered surface cannot be obtained. In more detail, in the zigzag motion of the robot arm, when the blade is moved toward work, since the pressing force of the blade increases, the chamfering quantity increases. On the other hand, when the blade is moved away from work, since the pressing force of the blade decreases, the chamfering quantity decreases.

The non-uniformity of the chamfering quantity causes not only a degradation of the external appearance of the products but also a reduction of the strength of the products.

To overcome these problems, various improvement methods have been so far made, when work is chamfered by use of a robot.

Figure 8:
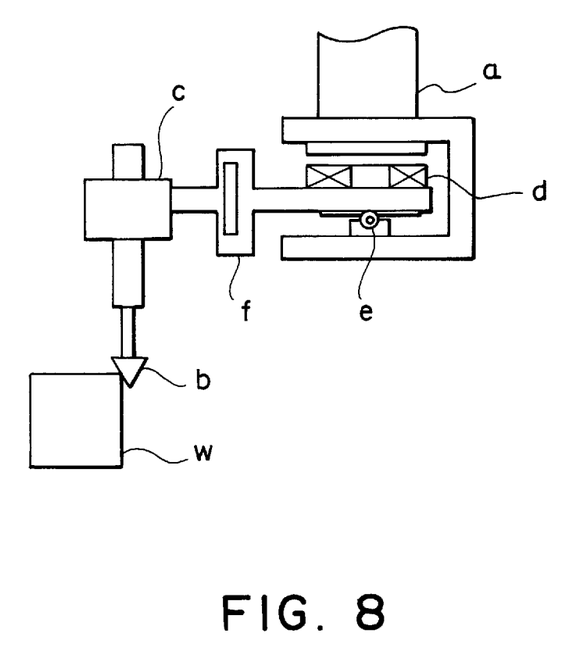
FIG. 8 is an illustration related to Japanese Published Unexamined (Kokai) Patent Application No. 63-196367.

For instance, as shown in FIG. 8, Japanese Published Unexamined (Kokai) Patent Application No. 63-196367 has proposed such an automatic chamfering control method that: an electromagnetic variable compliance mechanism d is provided between a wrist a of a robot provided with a locating function and a tool holder c having a chamfering tool b; a displacement gage e and a force sensor f are both arranged at the movable portion of the compliance mechanism d; the tool b is fed in the work w direction by the variable compliance mechanism d; the contact position between the chamfering tool b and the work w is detected by the force sensor f and further stored; the pressing force of the chamfering tool b against the work w is detected by the force sensor f; the variable compliance mechanism d is so controlled that the pressing force can be set to a previously determined set value; the feed rate of the chamfering tool b relative to the work w is detected by the displacement gage e; and the feeding motion of the chamfering tool b is stopped on the basis of the stored contact displacement, whenever the chamfering quantity has reached a predetermined value.

Figure 9:
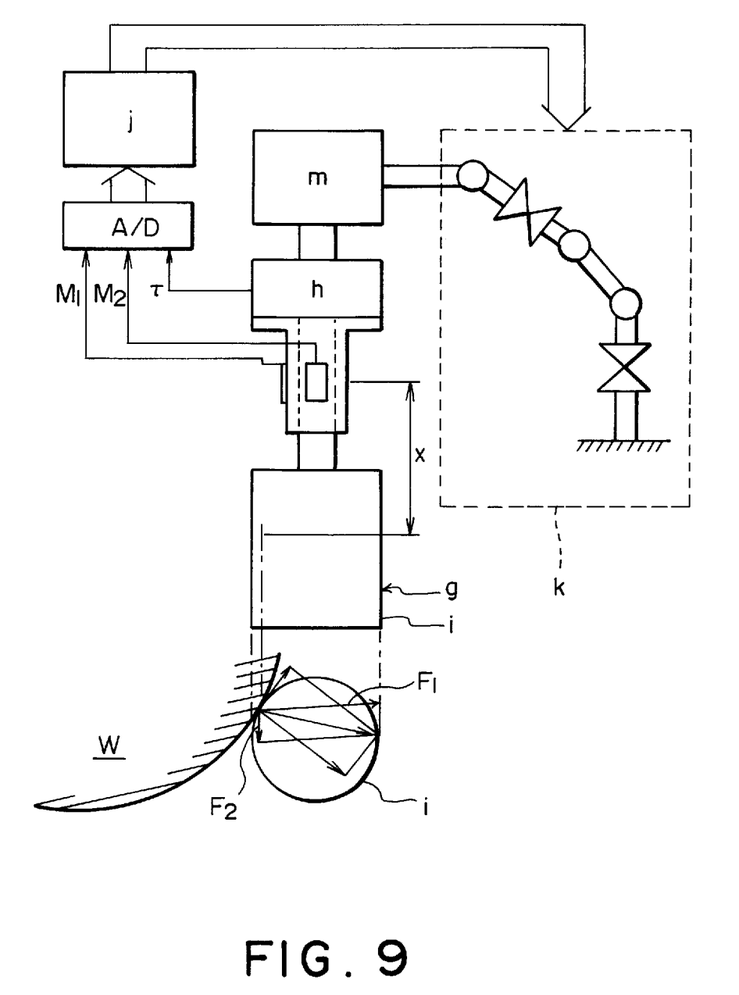
FIG. 9 is an illustration related to Japanese Published Unexamined (Kokai) Patent Application No. 61-109663.

Further, as shown in FIG. 9, Japanese Published Unexamined (Kokai) Patent Application No. 61-109663 has proposed such an automatic profiling method that: when work is polished or ground by a multi-degree-of-freedom robot having a grinder g at its finger end, the rotational torque τ of a grinder g is measured by use of a torque meter h or a current value or a rotational speed of a motor m for driving the grinder g; two orthogonal component forces $F_1$ and $F_2$ of the grinding resistance force generated during grinding work are measured in the form of moments based upon an arm length x as $M_1=F_1 \cdot x$, and $M_2=F_2 \cdot x$; the spacial coordinates of the contact point between a grinding portion i of the grinder g and the work w and direction ratio of the contact surface are both obtained by a computer j; and the positions and direction of a rod arm k are so controlled that the torque, the spacial coordinates of the contact point, and the contact surface are all set to predetermined values, respectively.

In the above-mentioned prior art methods, however, since the additional procedure of detecting the pressing force of the chamfering tool against work and the rotational toque of the grinder must be both detected and further feedbacked to a robot controller, the control processing is complicated and thereby the processing device is large-sized. As a result, another problem arises in that the installation cost increases. Therefore, there exists a need of a processing method and a processing device, which can achieve the chamfering work under a constant force, without complicating the chamfering method and device.

SUMMARY OF THE INVENTION

With these problems in mind, therefore, it is the object of the present invention to provide a press processing method and a press processing device, which can achieve chamfering work by pressing a chamfering tool against work under a predetermined contact pressure, without detecting the pressing force of the chamfering tool against work or without feedbacking the detected force to the robot controller.

To achieve the above-mentioned object, the present invention provides a press processing method, comprising the steps of: rotatably holding processing means in such a state that pressure caused by a dead load of the processing means is not applied to a processing portion of the processing means; and processing work by the processing means by pressing the processing portion of the processing means against the work under a constant pressing force obtained by pivoting the processing means in a predetermined direction under a constant torque by constant torque applying means.

Further, it is preferable that the processing means is any one of a grinding device, a polishing device, a cutting device, a brushing device, and a plating device; and the constant torque applying means is a servomotor.

Further, it is preferable that the state where the pressure caused by the dead load of the processing portion of the processing means is not applied to the processing portion of the processing means can be realized by holding a middle portion of a balancing rod member having the processing means at one end thereof and a counter weight at the other end thereof by use of a support body.

Further, it is preferable that the state where the pressure caused by the dead load of the processing portion of the processing means is not applied to the processing portion of the processing means can be realized by adding a torque for canceling the pressure caused by the dead load of the processing portion of the processing means, to the constant torque.

Further, it is preferable that when the processing means is connected to a drive source for driving the processing portion of the processing means via a wire or pipe, the wire or pipe is arranged in such a way that no torsional or tensile force is applied to connecting portions of the wire and pipe.

Further, the present invention provides a press processing device used being mounted on automatic mechanical processing means such a multi-joint robot, comprising: processing means held by a support body in such a way that pressure caused by a dead load of said processing means is not applied to a processing portion thereof; constant torque applying means for pivoting said processing means in a predetermined direction at a constant torque; and a mounting member for mounting said constant torque applying means to a robot arm, work being processed by said processing means in such a state that the processing portion of said processing means is pressed against the work under a constant pressing force.

Further, the present invention provides a press processing device used being mounted on automatic mechanical processing means such a multi-joint robot, comprising: processing means for processing work; torque calculating means for calculating a torque for canceling pressure caused by dead load of a processing portion of processing means; constant torque applying means for pivoting said processing means in a predetermined direction at a constant torque obtained by adding the canceling torque calculated by said torque calculating means; and a mounting member for mounting said constant torque applying means to a robot arm, work being processed by said processing means in such a state that the processing portion of said processing means is pressed against the work under a constant pressing force.

Further, it is preferable that said mounting member is so constructed that the processing portion of said processing means is located on an extension line of a central axis of the robot arm.

Further, it is preferable that the state where pressure caused by the dead load of the processing portion of the processing means is not applied to the processing portion of the processing means can be realized by holding a middle portion of a balancing rod member having the processing means at one end thereof and a counter weight at the other end thereof with a support body.

Further, it is preferable that the processing means is any one of a grinding device, a polishing device, a cutting device, a brushing device, and a plating device; and the constant torque applying means is a servomotor.

Further, it is preferable that a blade of the polishing device is formed into a conical shape having an apex angle of 40 to 50 degrees.

Further, it is preferable that when the processing means is connected to a drive source for driving the processing portion of the processing means via a wire or pipe, the wire or pipe is arranged in such a way that no torsional or tensile force is applied to connecting portions of the wire and pipe.

In the press processing device according to the present invention, since the processing portion (e.g., blade) of the processing means (e.g., grinder) is pressed against the work at a constant torque by the constant torque applying means (e.g., servomotor); since the processing means (grinder) is supported by the support body (12) in such a way that pressure caused by dead load of the processing means (grinder) is not applied to the processing portion (blade); or since a torque for canceling the pressure applied to the processing portion (blade) due to the dead load of the processing means (grinder) is calculated and further added to the constant torque of the constant torque applying means (servomotor); it is possible to process work by pressing the processing portion (blade) of the processing means (grinder) against work, without detecting the pressing force of the processing portion against the work or without feedbacking the detected pressing force to the robot controller.

DETAILED DESCRIPTION OF THE PREFERRED EMBODIMENTS

Some embodiments of the press processing method and device according to the present invention will be described hereinbelow with reference to the attached drawings. However, various changes and modifications can be made in the invention without departing from the spirit and scope thereof.

(First embodiment)

Figure 1:
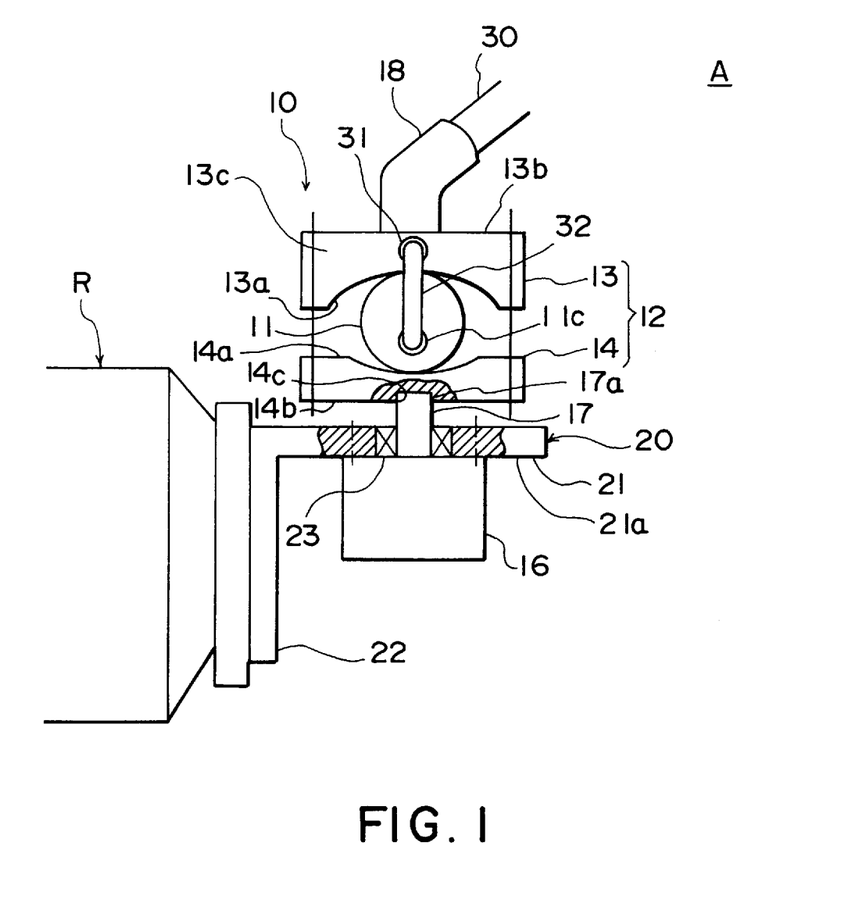
FIG. 1 is a side, partially broken view showing a first embodiment of the press processing device adopted for the press processing method according to the present invention.
Figure 2:
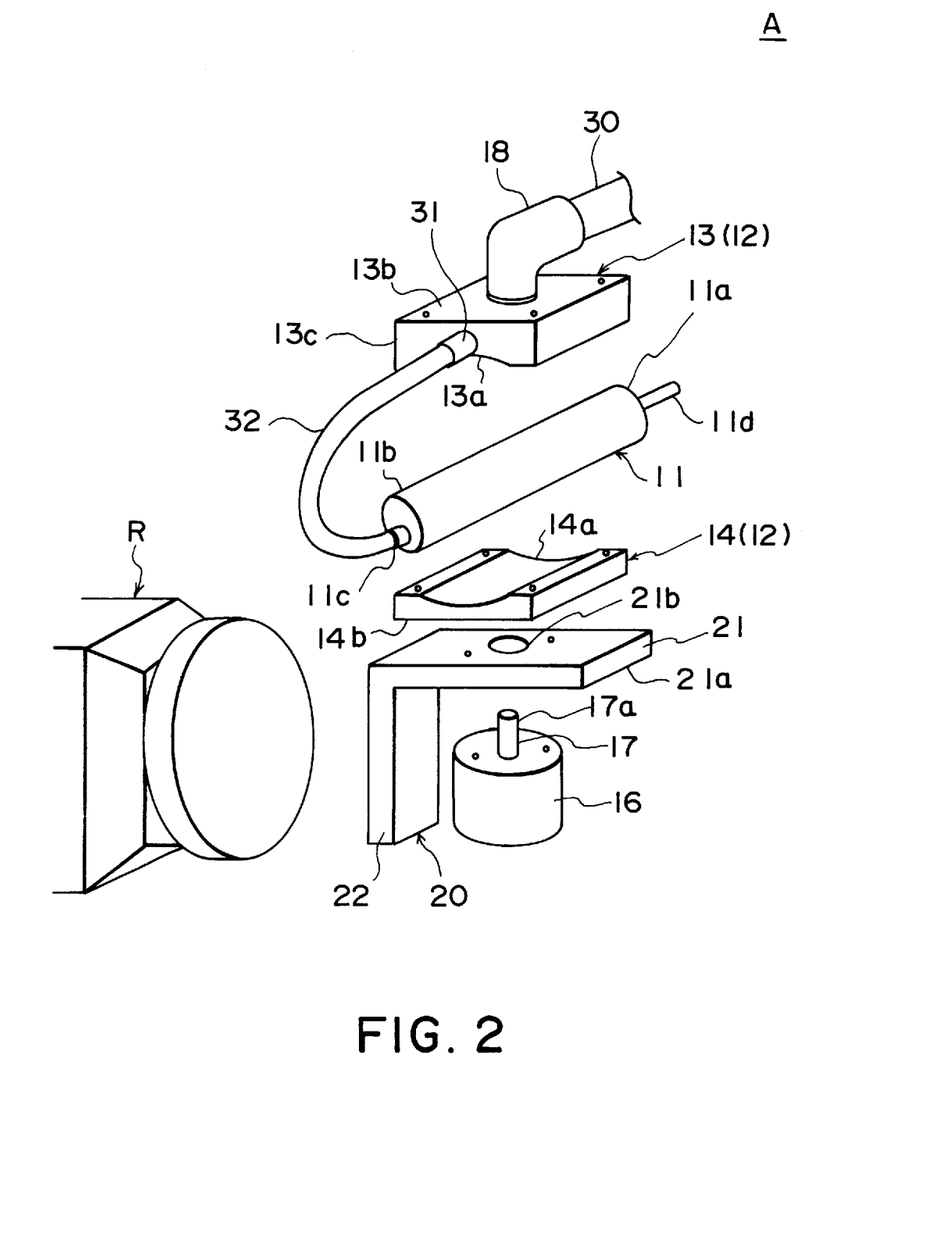
FIG. 2 is an exploded view showing the same device shown in FIG. 1.
Figure 3A:
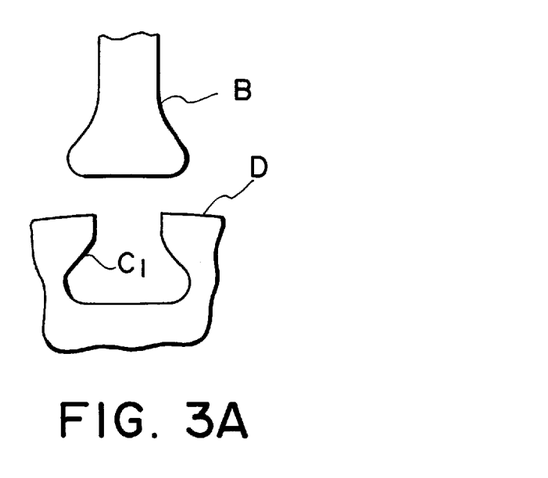
FIGS. 3A and 3B are illustrations showing a groove formed in a turbine disk to be chamfered, in which 3A is referred to as a dovetail groove and 3B is referred to as Christmas tree groove.
Figure 3B:
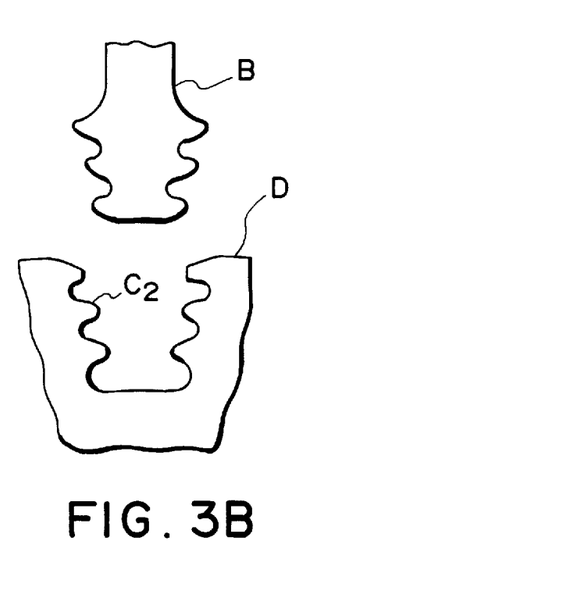

FIG. 1 is a side view showing the first embodiment of the press processing device A used for the press processing method according to the present invention, and FIG. 2 is a perspective view showing the same. In practice, this press processing device A is used to chamfer a groove $C_1$ or $C_2$ (serrated portion), as shown in FIGS. 3A and 3B, through which a turbine blade B can be implanted in a turbine disk D. Further, FIG. 3A shows a groove $C_1$ referred to as a dovetail used for a compressor, and FIG. 3B shows a groove $C_2$ referred to as a Christmas tree used for a power turbine.

The press processing device A is composed of mainly a body 10, and an L-shaped mounting member 20 having a body fixing portion 21 for fixing the body 10 to an end of a robot arm R and an arm joining portion 22 joined with the end of the robot arm R.

The body 10 comprises an air grinder 11, a support body 12 composed of an upper member 13 and a lower member 14 for holding the air grinder 11 therebetween, and a servomotor 16 having a drive shaft 17 and fixed to the lower member 14 of the support body 12. This servomotor 16 is fixed to the reverse surface 21a of the body fixing portion 21 of the mounting member 20 by use of bolts, for instance. Further, the drive shaft 17 of the servomotor 16 projects through a through hole 21b formed in the body fixing portion 21 via a bearing 23 attached to the through hole portion of the body fixing portion 21. Further, the end portion 17a of the projecting drive shaft 17 is fixed to the reverse surface of the lower member 14 of the support body 12 at roughly the central portion thereof.

The upper member 13 of the support body 12 is formed with a circular arc-shaped inner surface 13a so as to correspond to an outer cylindrical shape 11a of the held air grinder 11. Further, an air hose connector 18 is rotatably attached to a central portion of the upper surface 13b of the upper member 13. Therefore, when the body 10 is pivoted by the servomotor 16, it is possible to prevent a reaction force caused by a torsional or tensile force of the air hose 30 connected to the air hose connector 18 from being applied to the body 10. Further, an air hose connecting portion 31 formed on one side surface 13c of the upper member 13 communicates with the air hose connector 18 through an air passage (not shown) formed in the upper member 13. One end of the air hose 32 is connected to the air hose connecting portion 31 attached to the upper member 13 of the support body 12, and the other end of the air hose 32 is connected to an air supply portion 11c attached to a base end portion 11b of the air grinder 11. Further, as shown, it is preferable that the air hose connecting portion 31 attached to the side surface 13c of the upper member 13 is connected to the air supply portion 11c attached on the same side of the air grinder 11 so that the arrangement of the air hose 32 can be simplified.

On the other hand, the lower member 14 of the support body 12 is formed with a circular arc-shaped inner surface 14a so as to correspond to an outer cylindrical shape 11a of the held air grinder 11, in the same way as with the case of the inner surface 13a of the upper member 13. Further, the lower member 14 is formed with a recessed portion 14c (shown in FIG. 1) fitted to the end portion 17a of the drive shaft 17 of the servomotor 16 at the central portion thereof.

Therefore, when the air grinder 11 is sandwiched between the upper member 13 and the lower member 14 of the support body 12 and further fixed by use of bolt nuts, it is possible to hold the air grinder 11 by the support body 12. In this case, in order to prevent the dead load of the air grinder 11 from being applied onto work during chamfering work, the air grinder 11 is supported between the upper and lower members 13 and 14 of the support body 12, after having been well balanced.

The arm joining portion 22 of the mounting member 20 of the press processing device A constructed as described above is fixed to an end of the arm R, as shown in FIG. 1.

The chamfering work by use of the robot provided with the press processing device A of the present invention will be described hereinbelow. In the following description, the chamfering work is commanded by a robot controller (not shown).

(1) The robot arm R is moved to locate a processing portion (e.g., blade) 11d of the air grinder 11 at a vicinity of work W.

(2) The processing portion 11d of the air grinder 11 is rotated.

(3) The robot arm R is moved to bring the processing portion 11d of the air grinder 11 into contact with a chamfered surface of the work W.

(4) The servomotor 16 is driven at a constant torque to pivot the body 10 in a predetermined direction, so that the processing portion 11d of the air grinder 11 is brought into pressure contact with the work W under a predetermined pressing force. During the chamfering work, the pressing force of the servomotor 16 is maintained at a constant level.

(5) The robot arm R is moved in accordance with command data to perform a predetermined chamfering work. In this case, since the processing portion 11d of the air grinder 11 is brought into pressure contact with the work W by the servomotor 16 always at a constant pressing force, it is possible to continue the chamfering work uniformly.

As described above, in the first embodiment, since the chamfering work can be made under a constant pressing force, without detecting the pressing force of the processing portion 11d of the air grinder 11 and further without feedbacking the detected pressing force it is possible to achieve the uniform chamfering work simply. Further, since the construction of the press processing device A is simplified as described above, the press processing device A can be manufactured at a relatively low cost. Further, since the costly feedback control is not required, the control system can be simplified, so that it is possible to reduce the total cost of the robot equipment, while improving workability.

(Second embodiment)

Figure 4:
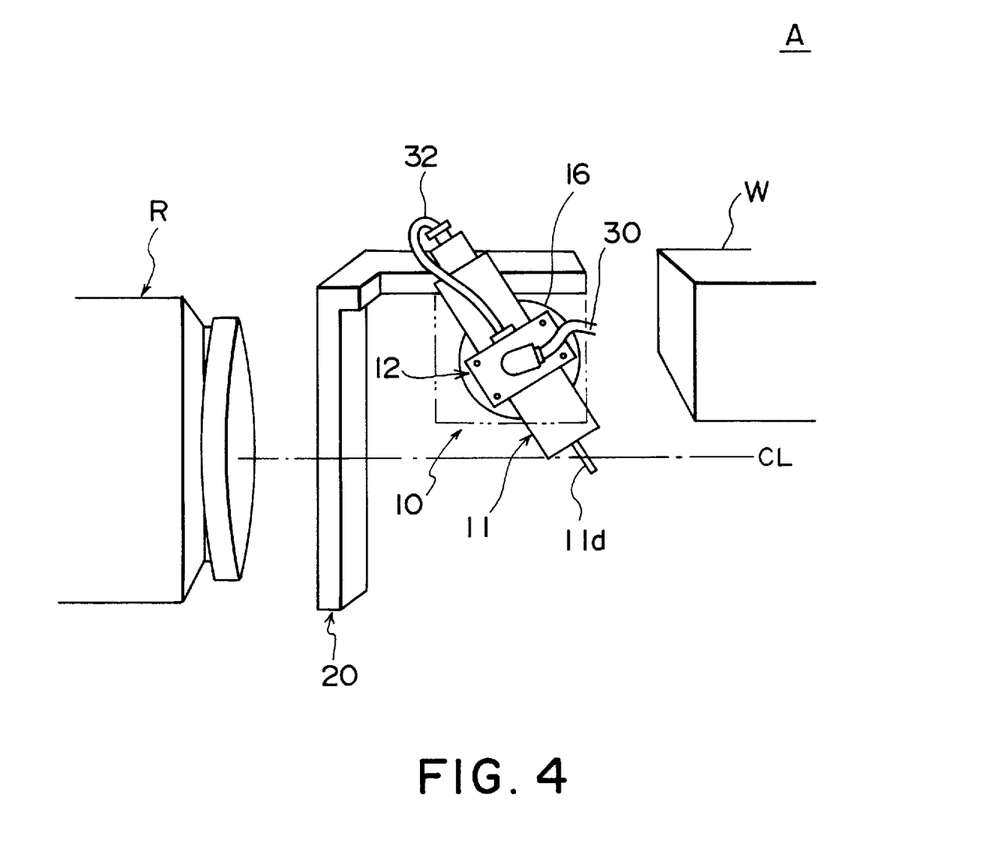
FIG. 4 is a perspective view showing a second embodiment of the press processing device adopted for the press processing method according to the present invention.

FIG. 4 is a side view showing the second embodiment of the press processing device A used for the press processing method according to the present invention, in which the mounting member 20 is shown being separated from the robot arm R. In this second embodiment, the mounting member 20 of the first embodiment is modified in such a way that the processing portion (blade) 11d of the air grinder 11 can be located on an extension line CL of the central axis of the robot arm R. In this second embodiment, there exists such an advantage that the movement stroke of the robot arm R can be minimized during the chamfering work for forming a curved surface, as compared with the case of the first embodiment. Further, the construction, the operation, and the effect of the second embodiment are quite the same as with the case of the first embodiment, except the abovementioned feature.

(Third embodiment)

Figure 5:
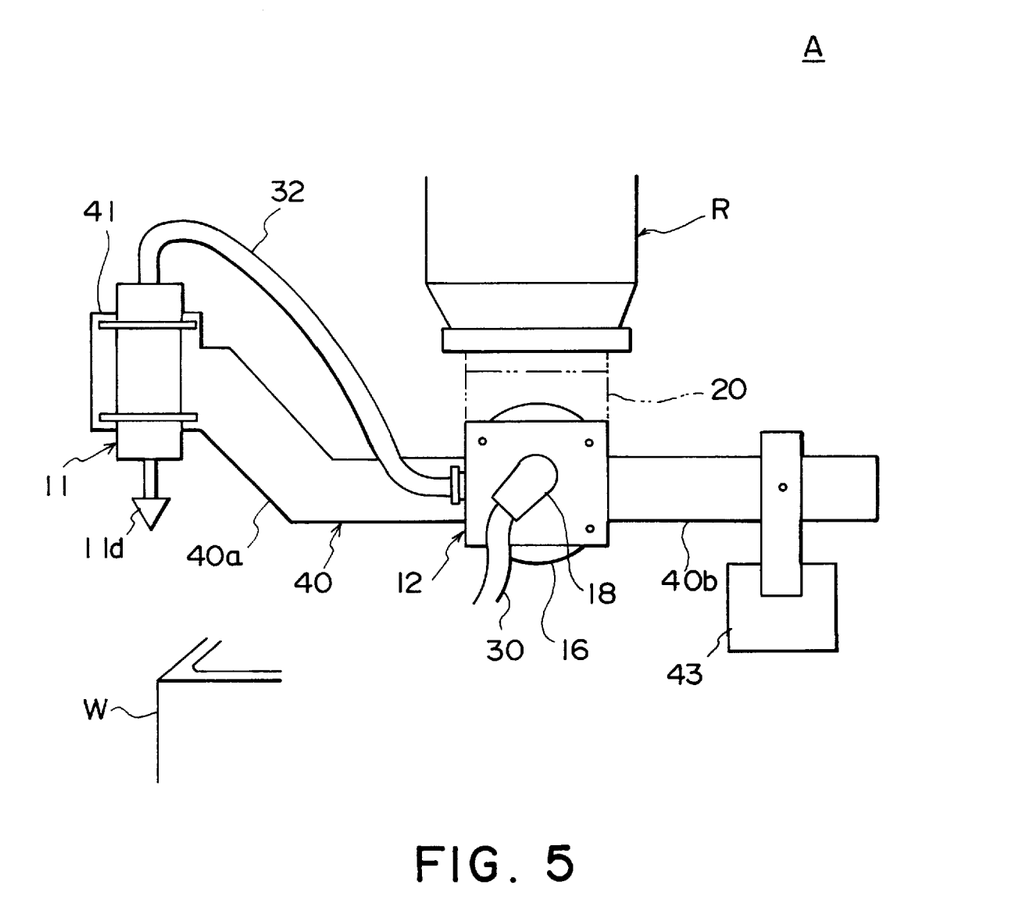
FIG. 5 is a side view showing a third embodiment of the press processing device adopted for the press processing method according to the present invention.

FIG. 5 is a side view showing the third embodiment of the press processing device A used for the press processing method according to the present invention, in which the mounting member 20 is shown being fixed to the robot arm R. In this third embodiment, the first embodiment is modified in such a way that a balancing rod member 40 is held by the support body 12. Further, the air grinder 11 is attached to one end of the balancing rod member 40 and a counter weight 43 is attached on the other end thereof in such a way that the position of the counter weight 43 can be adjustably moved. Therefore, the momentary force caused by the weight of the air grinder can be cancelled by that of the counter weight. In this case, the left side 40a of the balancing rod member 40 on which the air grinder 11 is attached is formed into such a shape that the movement stroke of the processing portion 11d of the air grinder 11 can be reduced during chamfering work. In the case shown in FIG. 5, for instance, the left side on which the air grinder 11 is mounted is bent obliquely upward from the middle portion to the left end of the balancing rod member 40. Further, a blade (the processing portion) 11d is formed into a conical shape (i.e., a top shape) having an apex angle of 40 to 50 degrees.

In the third embodiment, since the air grinder 11 is attached to one end (the left side) of the balancing rod member 40 and further the left side of the balancing rod member 40 is so formed as to be suitable for the processing of the air grinder 11, it is possible to further reduce the movement stroke of the robot arm R, as compared with that of the second embodiment. As a result, the commands applied to the robot can be simplified markedly, in particular when the chamfered surface is curved. Further, since the blade 11d of the air grinder 11 is formed into a conical shape having an apex angle of about 40 to 50 degrees, even if the locus of the robot arm R is deflected, since the blade can be moved so as to absorb the deflection of the robot arm R, it is possible to prevent the dispersion of the chamfering work due to the deflection of the locus of the robot arm R.

The press processing method and device according to the present invention have been explained by taking the case of the chamfering work, without being limited only to the chamfering work, the press processing method and device according to the present invention can be applied to the other work.

Figure 6:
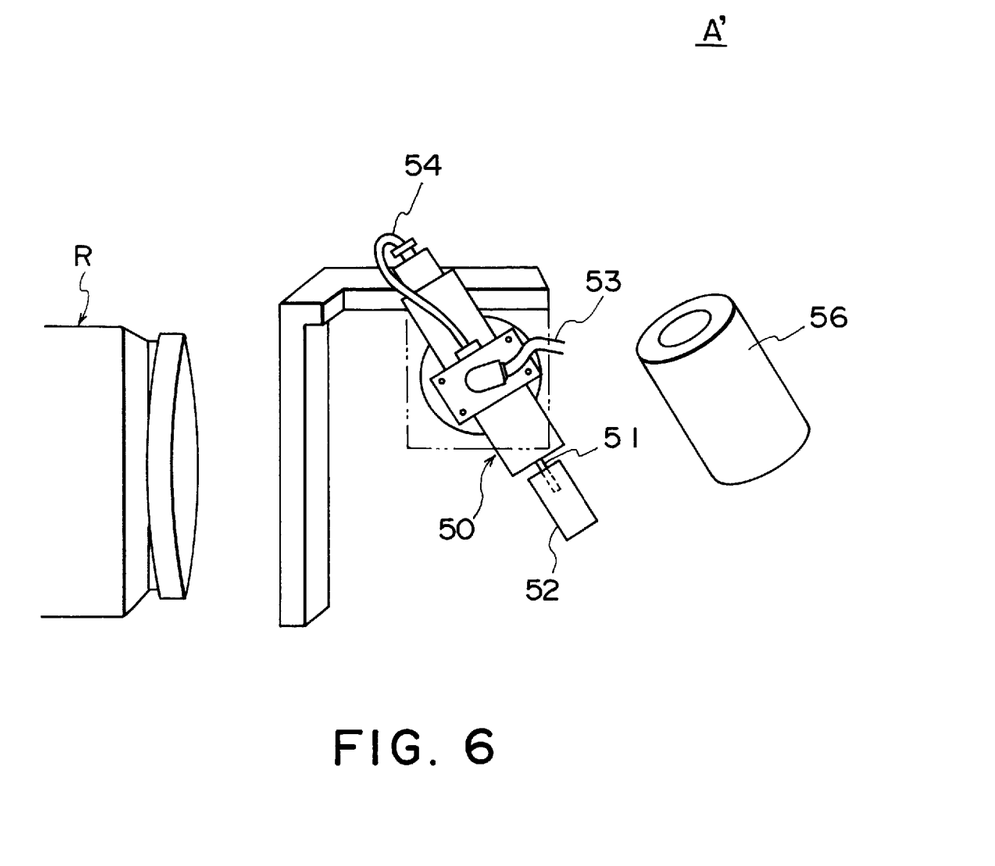
FIG. 6 is a perspective view showing another modification of the press processing device adopted for plating work including a grip process.

For instance, FIG. 6 shows a plating device to which the press processing device according to the present invention is applied. In FIG. 6, a rotary application device 50 is attached, instead of the air grinder 11. In this case, when a cotton pad 52 is attached to the rotary shaft 51 of the rotary application device 50, it is possible to perform plating (or gilding, coating, washing, etc.) under a uniform application pressure. Further, when the rotary application device 50 is applied to the plating work including grip process, a uniform plating work can be made. Further, in FIG. 6, the reference numerals 53 and 54 denote pipes through which plating liquid is fed, and 56 denotes a part to be plated.

Further, as the method of preventing the dead load of the processing means (e.g., grinder) from being applied to the processing portion (e.g., blade) as a pressure force, various methods can be considered. For instance, calculating means for calculating a torque for canceling the pressure caused by the dead load of the processing means (grinder) is provided for the robot controller, and the calculated canceling torque is added to a constant torque to be applied to the constant torque applying means (servomotor) so that the dead load of the processing means (grinder) will not be applied to the processing portion (blade).

As described above, in the press processing method and device according to the present invention, there exists such an excellent effect that the press processing can be made under a constant pressing force, without detecting the pressing force of the processing portion (blade) against work and without feedbacking the detected pressing force to the robot controller.

In addition, since no feedback control is made, the construction of the press processing device can be simplified, and thereby the cost of the press processing device can be reduced.

What is claimed is:

1. A method for pressing a tool provided to a tool supporting body on a work by a constant force, the method comprising the steps of:

holding the tool supporting body rotatably in such a state that a force caused by a weight of the tool and the tool supporting body is not applied to a portion of the tool which is in contact with the work; and actuating the tool and pressing the tool against the work under a constant pressing force at any rotational angle of a position of the tool supporting body by rotating the tool in a predetermined direction under constant torque by constant torque applying means.

2. The method of claim 1, wherein the tool is any one of a grinding device, a polishing device, a cutting device, a brushing device, and a plating device; and the constant torque applying means is a servomotor.

3. The method of claim 1, wherein the state where the force caused by the weight of the tool and the tool supporting body is not applied to the portion of the tool which is in contact with the work is realized by holding a middle portion of a balancing rod member having the tool at one end thereof and a counter weight at the other end thereof by use of a support body.

4. The method of claim 1, wherein the state where the forced caused by the weight of the tool and the tool supporting body is not applied to the portion of the tool which is in contact with the work is realized by adding a torque for canceling the force to the constant torque.

5. The method of claim 1, wherein when the tool supporting body is provided with a connecting portion which connects the tool supporting body with a wire or pipe providing energy to drive the tool, the connecting portion is located at the rotational center of the tool supporting body and is arranged in such a way that the wire or pipe is allowed to rotate with respect to the tool supporting body without applying torsional or tensile force to the tool supporting body.

6. A device for pressing a tool provided to a tool supporting body on a work by a constant force the device comprising:

a mounting member provided to a robot arm with the tool supporting body rotatably provided to the mounting member;

a tool held by the tool supporting body in such a way that a force caused by a weight of the tool and the tool supporting body is not applied to a portion of the tool which is in contact with the work; and means for applying the constant force to the tool at any rotational angle of a position of the tool supporting body by rotating the tool supporting body in a predetermined direction at a constant torque the applying constant force means provided to the mounting member;

wherein the portion of the tool which is in contact with the work is pressed against the work under a constant pressing force at any rotational angle of the position of the tool supporting body.

7. A device for pressing a tool provided to a tool supporting body on a work by a constant force, the device comprising:

a mounting member provided to a robot arm with the tool supporting body rotatable provided to the mounting member;

a tool held by the tool supporting body;

means for calculating torque for canceling pressure caused by a weight of the tool and the tool supporting body; and means for applying constant force to the tool at any rotational angle of a position of the tool supporting body by rotating the tool supporting body in a predetermined direction at a predetermined torque obtained by adding a canceling torque calculated by the torque calculating means, the applying constant force means provided to the mounting member;

wherein a portion of the tool which is in contact with the work is pressed against the work under a constant pressing force at any rotational angle of the position of the tool supporting body.

8. The device of claim 6, wherein said mounting member is so constructed that the portion of said tool is located on an extension line of a central axis of the robot arm.

9. The device of claim 7, wherein said mounting member is so constructed that the portion of said tool is located on an extension line of a central axis of the robot arm.

10. The device of claim 6, wherein the state where the force caused by the weight of the tool and the tool supporting body is not applied to the portion of the tool which is in contact with the work is realized by holding a middle portion of a balancing rod member having the tool at one and thereof and a counter weight at the other end thereof with a support body.

11. The device of claim 7, wherein the state where the force caused by the weight of the tool and the tool supporting body is not applied to the portion of the tool which is in contact with the work is realized by holding a middle portion of a balancing rod member having the tool at one end thereof and a counter weight at the other end thereof with a support body.

12. The device of claim 6, wherein the tool is any one of a grinding device, a polishing device, a cutting device, a brushing device, and a plating device; and the constant torque applying means is a servomotor.

13. The device of claim 7, wherein the tool is any one of a grinding device, a polishing device, a cutting device, a brushing device, and a plating device; and the constant torque applying means is a servomotor.

14. The device of claim 6, wherein a blade of the polishing device is formed into a conical shape having an apex angle of 40 to 50 degrees.

15. The device of claim 6, wherein the tool supporting body is provided with a connecting portion which connects the tool supporting body with a wire or pipe for providing energy to drive the tool, and the connecting portion is located at the rotational center of the tool supporting body and is arranged in such a way that the wire or pipe is allowed to rotate with respect to the tool supporting body without applying torsional or tensile force to the tool supporting body.

16. The device of claim 7, wherein a tool supporting body is provided with a connecting portion which connects the tool supporting body with a wire or pipe for providing energy to drive the tool and the connecting portion is located at the rotational center of the tool supporting body and is arranged in such a way that the wire or pipe is allowed to rotate with respect to the total supporting body without applying torsional or tensile force to the tool holder.

* * * * *